United States Patent [19]

Riou et al.

[11] Patent Number: 4,536,219

[45] Date of Patent: Aug. 20, 1985

[54] THERMOGRAPHIC RECORDING COMPOSITIONS

[75] Inventors: Claude R. Riou, Veyrier du lac; Jean F. Fayard, St. Julien en Genevois, both of France

[73] Assignee: Societe Anonyme: Aussedat-Rey, France

[21] Appl. No.: 513,304

[22] Filed: Jul. 13, 1983

[30] Foreign Application Priority Data

Jul. 16, 1982 [FR] France ............................ 82 12845

[51] Int. Cl.$^3$ ............................ C09D 11/00

[52] U.S. Cl. ............................ 106/21; 106/14.5; 106/31; 346/211; 346/212; 346/216; 346/218; 346/225

[58] Field of Search ............................ 106/14.5, 21, 31; 346/216, 217, 225, 210–212, 218; 427/150–152; 548/211

[56] References Cited

U.S. PATENT DOCUMENTS

| | | | |
|---|---|---|---|
| 3,080,254 | 3/1963 | Grant | 548/211 |
| 3,539,375 | 11/1970 | Baum | 346/217 |
| 3,746,675 | 7/1973 | Blose | 346/217 |
| 4,052,244 | 10/1977 | Skoultchi | 548/211 |

FOREIGN PATENT DOCUMENTS

| | | | |
|---|---|---|---|
| 2727775 | 5/1978 | Fed. Rep. of Germany | 548/211 |
| 1440892 | 4/1966 | France | 346/200 |
| 2272082 | 8/1978 | France | 346/217 |
| 2391858 | 12/1978 | France | 346/209 |
| 2427210 | 12/1979 | France | 346/216 |
| 2427209 | 12/1979 | France | 346/200 |
| 7928857 | 6/1980 | France | 346/200 |
| 0104908 | 8/1979 | Japan | 346/225 |
| 406257 | 8/1966 | Switzerland | 346/200 |

OTHER PUBLICATIONS

*Chemical Abstracts,* vol. 78, Abstract No. 124577y (1973) (relating to Japanese Pat. No. 72 46,059).
*Chemical Abstracts,* vol. 92, Abstract No. 128902n (1980) (relating to Japanese Pat. No. 79,109,968).
*Chemical Abstracts,* vol. 92, Abstract No. 128903p (1980) (relating to Japanese Pat. No. 79,109,986).
*Chemical Abstracts,* vol. 80, Abstract No. 67415j (1976) (relating to Japanese Pat. No. 73,05,906).
*Chemical Abstracts,* vol. 80, Abstract No. 56458z (1976) (relating to Japanese Pat. No. 73 08,500).
*Chemical Abstracts,* vol. 79, Abstract No. 1343g (1973) (relating to Japanese Pat. No. 73 08,929).
*Chemical Abstracts,* vol. 91, Abstract No. 211403a (1979) (relating to German Offen. No. 2,800,019).
*Chemical Abstracts,* vol. 88, Abstract No. 122640w (1978) (relating to German Offen. No. 2,727,699).
*Chemical Abstracts,* vol. 90, Abstract No. 138654f (1979) (relating German Offen. No. 2,805,174).
*Chemical Abstracts,* vol. 87, Abstract No. 201307a (1977) (relating to German Offen. No. 2,610,853).
Kauffman et al., "The Discovery of Saccharine: A Centennial Retrospect" from *Ambix,* 1978, vol. 25, No. 3, pp. 191–207.
*Chemical Abstracts,* vol. 92, Abstract No. 173799v (1980) (relating to Magri et al., Thermochim. Acta, 1980, vol. 36, No. 3, pp. 279–286).
V. Grignard, *Traite de Chimie Organique,* pp. 548–563.
*Derwent Japanese Patents Report,* vol. 78, No. 29 for Japanese Appln. No. J7 802 3205.
*Patent Abstracts of Japan,* vol. 4, No. 96 for Japanese Appln. No. 53-127875.
*Chemical Abstracts,* vol. 71, Abstract No. 66055u (1969) (relating to French Pat. No. 1,542,505).

*Primary Examiner*—Bruce H. Hess
*Attorney, Agent, or Firm*—Lerner, David, Littenberg, Krumholz & Mentlik

[57] ABSTRACT

The invention relates to novel thermographic recording compositions. Novel color developers for thermographic compositions consist of the compounds of the formula:

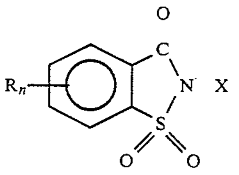

or their salts

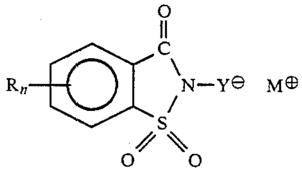

The invention is useful for recording supports for data generally, for example, computers, medical, etc.

18 Claims, No Drawings

THERMOGRAPHIC RECORDING COMPOSITIONS

BACKGROUND OF THE INVENTION

The present invention relates to novel thermographic recording compositions, as well as the thermographic recording supports obtained from these compositions. The invention is characterised by the use of saccharin derivatives (or benzoic sulfimide, or 2,3-dihydro 1,2-benz 3-isothiazolone 1,1-dioxide) of the formula:

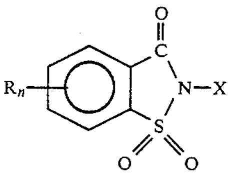

or their salts

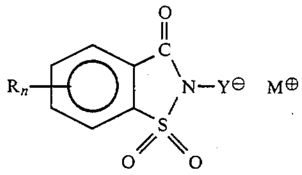

(with Y = X less one hydrogen)

the one or more substituents R of the benzene portion, which are identical or different with $0 \leqq n \leqq 4$ may be the following: H, alkyl, $NO_2$, halogen, aryl, $NH_2$, OH, COOH, $SO_3H$, $NR_1R_2$, $COOR_3$, $OR_4$ ($R_1$, $R_2$, $R_3$, $R_4$=alkyl or aryl, X representing H or a group possessing a labile H and capable of forming a stable anion by loss of a proton $H^+$, and $M^+$ representing a metal cation), or their mixtures, as color developer in thermoreactive compositions comprising a color generator compound. Preferably, X represents H, —OH, $(CH_2)_m$—OH, with $1 \leqq m \leqq 10$, or:

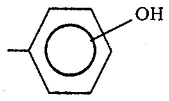

the hydrogen atom being particularly preferred. On a rise in temperature, these derivatives of saccharin or their salts react with the color generator to give an irreversible color. These two types of products are conditioned on a support (paper or other) which may be used in all equipment having a thermal visualisation system for data: for example, computer printers, medical and industrial monitoring equipment, telecopiers.

At present, the industrial uses of saccharin and its derivatives are as follows.

Sweetening agent: in fact, on account of its intense sweet taste, saccharin finds its principal use here.

Complexing agent for metallic silver formed by reduction in a photothermographic system, enabling the colors to be intensified. FUJI PHOTO FILM Co., FR No. 1 542 505, Oct. 18, 1968, 3M, U.S. Pat. No. 3,080,254 (Mar. 5, 1963). 1963). In this U.S. Pat. No. 3,080,254, the use of certain heterocyclic derivatives among which is saccharin, are recommended to form complexes in ionic form with silver ions.

In the present application saccharin is used in another form and in the presence of dyes to react with the latter.

Bactericidal and fungicidal agent: this is the case of certain derivatives of suitably substituted saccharin.

JAPAN AGRICULTURAL CHEMICALS AND INSECTICIDES Co. Ltd,
Japan No. 72 46,059 (Nov. 20, 1972), MEIJI SEIKA KAISHA LTD, Japan Kokai,
Tokkyo Koho No. 79,109,968 (Aug. 29, 1979), No. 79,109,986 (Aug. 29, 1979), KUMIAI CHEMICAL INDUSTRI Co. Ltd,
Japan No. 73,05,906 (Feb. 21, 1973),
Japan No. 73,08,500 (Mar. 15, 1973),
Japan Kokai No. 73,08,929 (Feb. 3, 1973).

Combustion retarding and fire-extinguishing agent:

DYNAMIT NOBEL A.G., Ger. offen. No. 2,800,019, Jan. 2, 1978,

CIBA GEIGY A.G.,
Ger. Offan No. 2,727,699, Jan. 5, 1978,
Ger. Offan No. 2,727,775, Jan. 5, 1978.

Adhesive cross-linking catalyst:

NATIONAL STARCH AND CHEMICAL CORP.,
Ger. Offen No. 2,805,174, Feb. 1, 1979 and U.S. Pat. No. 4,052,244, Oct. 4, 1977.

All these uses have nothing to do with the use according to the present invention: developer of color generators in thermoreactive compositions.

The recent increase in requirements in information and in communication has caused the use and demand for recording systems to progress, in the transmission and restitution of data. Among the latter, thermoreactive systems have experienced a very considerable development and this for several reasons:

the process of formation of the image is simple and enables good quality reproductions to be obtained as regards color and contrast, the equipment used is often easy to maintain and use, the thermal recording sheet, in addition to its remarkable technical performance, is of relatively low cost.

As recording sheets sensitive to heat usable for these applications, are known those described initially in French patent No. 1 440 892 (NATIONAL CASH REGISTER COMPANY) and subsequently, in the cascade of patents derived from this principal system, thus for example the patents U.S. Pat. No. 3,539,375 (NCR Company) and U.S. Pat. No. 3,746,675 (NCR Company).

All these patents deal with the following system: the heating induced is the reaction in the molten state of a colorless or pale colored chromogenic leuco-dye (color generator) and of a phenolic substance (developer) and leads to the formation of a colored species.

Different leuco-dye-phenolic compound couples have been described for these thermographic applications. For the first may be mentioned: the indolinic spiropyrans, the triphenyl-methane dye lactones, compounds of the family of fluoranes, phthalides, spirodihydropyrans (French Pat. No. 2 272 082), chromenes or chromanes, etc. For the second, may be mentioned: bisphenol A (4,4'-isopropylidene diphenol), p-tertiobutylphenol, p-phenylphenol, p,p'(methyl-1-n-hexylidene)diphenol, phenolic novolac resine resins etc.

Also known, as thermoreactive recording compositions, are those containing other developers of the above-described leuco-dyes, in place of phenolic comounds, such as for example:

metal salts of organic acid and, preferably, fatty acids, (resinates, acetates, phenates, stearates, ricinoleates, oleates, etc.). Swiss Pat. No. 406 257 (NCR Company), compounds of the structure:

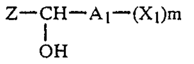

French patent application No. 79 28 857 (CIBA-GEIGY A.G.), carbonate or ether derivatives of 2,3-dihydroxy naphthalene. French patent application No. 2 427 210 (78-16 954) (LA CELLOPHANE), siliceous and phosphorus derivatives of 2,3-dihydroxy naphthalene. French patent application No. 2 427 209 (78-16 953) (LA CELLOPHANE), electronegatively substituted monoaldehydes or polyaldehydes and/or their reaction products with an organic compound containing hydroxyl groups or the intermediate products. Patent application in FRANCE No. 2 391 858 (78-15 806) (CIBA-GEIGY A.G.).

All these processes have, of course, their own qualities. It remains nonetheless that they have for the most part imperfections, particularly, as regards the stability and persistance over the long term of the recorded image. In fact, the majority of the latter have a more or less marked fading of the recorded colorations under the effect of ambient light, as well as an increase in the background fog in humidity and in heat.

This stability of the recorded image and of the uncolored background depends, quite obviously, on the nature and the structure of the leuco-dye colour generator used, but also on the developer selected in combination with it. The combination chosen between the dye precursor and the developer has hence great importance on the qualities of preservation of the paper and of the recorded image.

GENERAL DESCRIPTION OF THE INVENTION

It has been discovered, according to the invention, that, in thermoreactive compositions, a quite different family of compounds could be used as a developer in association with conventional dye precursors.

This family is constituted by the derivatives of saccharin of structure

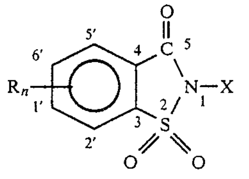

the one or more substituents R, identical or different with $o \leqq n \leqq 4$, being possibly H, alkyl, aryl, $NO_2$, halogen, $NH_2$, OH, COOH, $NR_1R_2$ ($R_1$, $R_2$=alkyl or aryl), $COOR_3$ ($R_3$=alkyl or aryl), $OR_4$ ($R_4$=alkyl or aryl), $SO_3H$, X being H or a group possessing a labile H and capable of forming a stable anion by loss of a proton $H^+$ and, preferably, H, —OH, $(CH_2)_m$—OH with $1 \leqq m \leqq 10$, or

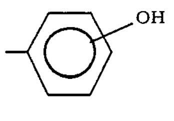

As non-limiting examples, may be mentioned: saccharin, 1'-bromo saccharin, 1'-nitro saccharin 1'-amino saccharin, saccharin 5'-carboxylic acid, meta or para disaccharin, 1-methylol saccharin, etc.

Fuller information on these compounds, as chemical products, may be obtained in the following publications:

Traitise on organic chemistry of V. GRIGNARD "Heterocycles à deux heteroatomes N et S", p.548 et seq.

G. B. KAUFFMAN and P. M. PRIEBE, Ambix, 1978, 25 (3), 191-207.

These derivative compounds of saccharin are used, either as such, or in the form of salts

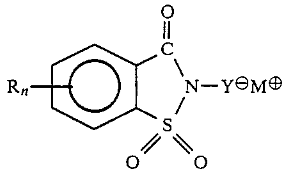

(with Y = X less one hydrogen)

These salts are obtained by the direct reaction of the saccharin derivative with a suitable metal salt, such as, for example, salts of the following metals: Cu, Cd, CO, Fe (II), Ni, Mn, Zn.

As literature regarding the conventional production and chemical properties of saccharin salts, we can cite:

Traitise on organic chemistry of V. GRIGNARD "Heterocycles à deux heteroatomes N et S", p. 548 et seq.

KVD, Alexander; KOHL, Albert; Ger. Offen No. 2,610,853, Sept. 22, 1977.

MAGRI A.D., D'ASCENZO G., NUNZIANTE CESARO S., Chiacchierini, E.; Thermochim. Acta, 1980, 36 (3) 279-86.

The thermographic recording compositions according to the invention therefore contain the following constituents: —one or several color generators ("color-former"): this substance may belong to several chemical families conventionally used as a thermoreagent like, for example, the lactones of triphenyl methane dyes, fluoranes, phthalides, leuco-dyes of triaryl methanes, spiropyrannes, chromenes, chromanes, leuco-dyes of phenoxazine or substituted phenothiazine.

As color generators, may be mentioned as non-limiting examples, the following compounds:

3,3-bis(p-dimethylaminophenyl)-6-dimethylaminophtalide (CVL), 3,3-bis-(p-dimethylaminophenyl)phtalide , 3-(p-dimethylaminophenyl)-3-(1,2-dimethylindole-3-yl)phtalide, 3-(p-dimethylaminophenyl)-3-(2-methylindole-3-yl)phtalide, 3,3-bis-(1,2-dimethylindole-3-yl)-5-dimethylaminophtalide, 3,3-bis-(1,2-dimethylindole-3-yl)-6-dimethylaminophtalide, 3,3-bis-(9-ethylcarbazole-3-yl)-5-dimethylaminophtalide, 3,3-bis(2-phenylindole-3-yl)-5-dimethylaminophtalide, 3-p-dimethylminophenyl-3-(1-methylpyrrole-2-yl)-6-dimethylaminophtalide, ether benzylique de 4,4'-bis-dimethylaminobenshydrine, N-halogenophenyl-leuco-auramine, N-2,4,5-trichlorophenyl-leuco-auramine, rhodamine-B-anilinolactame, rhodamine-(p-nitro-anilino)lactame, rhodamine-(p-chloranilino)-lactame, 7-dimethylamino-2-methoxyfluorane, 7-diethylamino-2-methoxyfluorane, 7-diethylamino-3-methoxyfluorane, 7-diethylamino-3-chlorofluorane, 7-diethylamino-3-chloro-2-methylfluorane, 7-diethylamino-2, 3-dimethylfluorane, 7-diethylamino-(3-acetylmethylamino)fluorane, 7-diethylamino-(3-methylamino)fluorane, 3,7-diethylaminofluorane, 7-diethylamino-3-(dibenzylamino)fluorane, 7-diethylamino-3-(methylbenzylamino)fluorane, 7-diethylamino-3-(chlorethylmethyl-amino)fluorane, 7-diethylamino-3-(diathylamino)fluorane, 2-phenylamino-3-methyl-6-(N-ethyl-N-p-toluyl)amino-fluorane, bleu de benzoyl-leucomethylene, bleu de p-nitrobenzyl-leucomethylene, 3-methyl-spiro-dinaphtopyrane, 3-ethyl-spiro-dinaphtopyrane, 3,3'-dichloro-spiro-dinaphtopyrane, 3-benzyl-spiro-dinaphtopyrane, 3-methyl-naphto-(3-methoxybenzo)-spiro-pyrane et 3-propyl-spiro-dibenzopyrane.

The colorless chromogenic substances mentioned may be used individually or in admixture. The derivative of saccharin used according to the invention enable all known color generators to be developed optimally. This development is optimal taking into account the color generator used. However, a certain number of qualities of the line formed: color, stability, intensity . . . . depend principally on the nature of the color generator and, in particular, the chemical structure of the family to which it belongs. In our case, the color developer of the family of saccharin reinforces certain of these qualities: intensity, stability to light, to moisture, but does not radically modify them. Thus, for example, a color generator leading, by the action of a conventional color developer to a dye little stable to light, will find, by the use of derivatives of saccharin, its fastness to light somewhat improved, but it will not become, for that matter, excellent.

a color developer, characteristic of the invention, belonging to the family of derivatives of saccharin

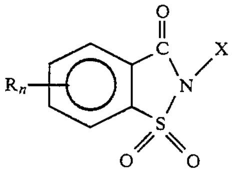

or their salts

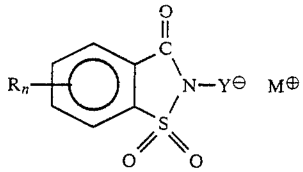

as previously defined. These compositions contain in addition all the species necessary for the formation of a layer of good quality on the support.

a polymeric binder whose principal role is to ensure the cohesion of the whole of the emulsion, as well as its fastening on the support. It can come into play also through its own characteristics on the softening of the layer. These binders are, either soluble in water (the color generator and the developer being, mostly, insoluble or very slightly soluble in water), in this case, it is possible to operate in one layer; or soluble in organic solvents, in this case, it is better to operate in two layers when the solvent used solubilises the color generator or the developer to avoid any premature reaction between the two compounds. The colour generator and the developer are then placed in different layers. These binders may be selected from the following families: acrylic, vinyl, cellulosic, styrene, halogen, maleic polymers or latices . . . . As non-limiting examples we can mention: starch, polyvinyl alcohol, hydroxyethyl cellulose, methyl cellulose, carboxy-methyl cellulose, gelatine, casein, gum arabic, salts of styrene and maleic anhydride copolymers, an emulsion of a copolymer of styrene and butadiene, an emulsion of a copolymer of vinyl acetate and maleic anhydride, a copolymer of vinylidene chloride.

waxes or compounds with low melting point which serve for adjusting the reaction temperature of the medium to a desired value, to prevent adhesion to the heating head, to avoid soiling by friction, for example paraffin waxes, polyolefinic waxes, fatty amides and their methylol derivatives, higher fatty acids and their metal salts, condensation products of a higher fatty acid and an amine, esters of polyalcohols and higher fatty acids, higher alcohols.

a pigment filler intended to give better consistency to the coating composition, to improve the whiteness of the background, to reduce the problems of stickiness of the layer and fouling and wear phenomena of the equipment using the emulsions, for example: $CaCO_3$, kaolin, talc, starch, $TiO_2$, ZnO, $MgCO_3$, $Al(OH)_3$, calcined clay, organic pigments like urea-formaldehyde polymerisates (for example "Pergopak" of CIBAGEIGY), colloidal or precipitated silica, various silicoaluminates.

various adjuvants currently used for the preparation and the layer formation of the emulsion: dispersants, bluing agents, surface-active agents, anti-foaming agents, plasticisers, antioxidants, anti UV agents, agents for buffering the pH of the medium and stabilising the composition like $NaHCO_3$ or $NH_4HCO_3$, the choice and nature of each of these products being easily done by the technician skilled in the art.

All these various constituents are ground, emulsified or dissolved in the medium and coated in one or several layers on a paper support or the like (plastic for example). Preferably, the color generator and the color developer are ground separately, so as to avoid any premature reaction. The two dispersions being mixed before the coating in the case of coating in a single layer. The nature, grammage of the support, as well as the number and thickness of the layers and their coating method depend on the intended use, as well as the desired effect, and are easily determined by the technician skilled in the art.

DESCRIPTION OF PREFERRED EMBODIMENTS

The various examples given below are purely for illustration and are not to be considered as in any way limiting.

EXAMPLE 1

The following compositions are ground separately:

| | |
|---|---|
| 15% Rhodoviol 4-20 polyvinyl alcohol in water (RHONE POULENC) | 46 g |
| Saccharin | 97 g |

-continued

| | | |
|---|---|---|
| (1) | Crodamide S (Stearamide of CRODA LTD) | 37 g |
| | Zinc stearate | 16 g |
| | Silica K 320 (precipitated silica of DEGUSSA) | 74 g |
| | Martifin (Aluminum hydroxide of Martinswerk) | 30 g |
| | Water | 696 g |
| | Dispex (COATEX polyacrylate) | 4 g |
| | | 1,000 g |
| (2) | Pergascript IBR black (colour former of CIBA-GEIGY) | 58 g |
| | Methocel ST 65 HG methylcellulose 50 to 5% in water (DOW CHEMICAL) | 105 g |
| | Crodamide S | 51 g |
| | Wheat starch | 50 g |
| | Water | 730 g |
| | Dispex (polyacrylate) | 4 g |
| | Protesol DOS (surface-active agent of PROTEX | 2 g |
| | | 1,000 g |

The following mixture is then prepared:

| | |
|---|---|
| Grinding (1) | 50 g |
| 15% Rhodoviol 4/20 PVA in water | 14 g |
| Water | 20 g |
| Grinding (2) | 22 g |

which is coated in the proportion of 6.5 $g/m^2$ dry on a paper of 50 $g/m^2$.

After drying and calandering, the paper is used on a XEROX 485 telecopier. We obtain a good quality of reproduction of the original, with black densities of 0.90 to 1.00. These densities are measured by reflection with a GAM RD 144 densitometer WRATTEN no. 106 filter).

EXAMPLE 2

The following compositions are ground separately:

| | | |
|---|---|---|
| (1) | Saccharin | 20 g |
| | 15% Rhodoviol 4-20 polyvinyl alcohol in water | 5 g |
| | Zinc acetate | 12 g |
| | Water | 70 g |
| | Dispex | 0.5 g |
| and | | |
| (2) | Lactone crystal violet (Reakt Violet K of BASF) | 25 g |
| | Wheat starch | 85 g |
| | 15% Rhodoviol 4-20 in water | 115 g |
| | Crodamide S | 67 g |
| | Zinc stearate | 17 g |
| | Dispex | 4 g |
| | Protesol DOS | 2 g |
| | Water | 685 g |
| | | 1,000 g |

Then the following mixture is prepared:

| | |
|---|---|
| Grinding (1) | 33 g |
| 15% Rhodoviol 4-120 in water | 15 g |
| Grinding (2) | 30 g |

which is coated in the proportion of 6.5 $g/m^2$ dry approximately on a paper of 55 $g/m^2$. After drying and calandering, this paper is used on an office calculating machine with an OLIVETTI LOGOS no. 7 thermal printer. The blue line had a density of 1.0 (GAM RD 144, densitometer WRATTEN filter no. 106). The reaction threshold of the paper is very marked and is situated at about 85° C.

EXAMPLE 3

The following composition is ground homogenously:

| | |
|---|---|
| DV 571 latex (ROHM Darstadt) at 50% | 14 g |
| Saccharin | 97 g |
| Crodamide S | 37 g |
| Zinc stearate | 16 g |
| K 320 silica | 74 g |
| Martifin | 30 g |
| Water | 696 g |
| Polysel (of BASF) | 4 g |

This layer is deposited in a proportion of 4 $g/m^2$ dry on a paper support of 55 $g/m^2$ then, after drying, there is deposited on top in the proportion of about 3 $g/m^2$ dry, the following previously ground composition:

| | |
|---|---|
| Pergascript IBR black colour former | 58 g |
| 15% Rhodoviol 4-20 in water | 105 g |
| Crodamide S | 51 g |
| Wheat starch | 50 g |
| Water | 730 g |
| Dispex | 4 g |
| Protesol DOS | 2 g |

After drying and possibly calandering, this paper is used in an apparatus for recording electrocardiograms of the "cardiopan 571" type of PHILIPS and enables a very finely resolved black line to be obtained, whatever the speed of passage of the paper 50, 25 or 10 mm/s. The density of the line is 1.15 (GAM RD 144 densitometer, WRATTEN no. 106 filter).

EXAMPLE 4

The following composition is ground homogeneously:

| | |
|---|---|
| Saccharin | 115 g |
| Ixan SGA (polyvinylidene chloride produced by SOLVAY) 20% in ethyl acetate | 420 g |
| Al $(OH)_3$ Martifin | 60 g |
| Ethyl acetate | 300 g |

This layer is deposited in the proportion of 4 $g/m^2$ on a polyester Terphane support of RHONE POULENC of 100μ thickness. After drying, there is deposited on top, in the proportion of about 3 $g/m^2$ dry, the following previously ground composition:

| | |
|---|---|
| Pergascript I.G.B. red colour former | 37.5 g |
| Wheat starch | 120 g |
| 15% Rhodoviol 4-20 polyvinyl alcohol in water | 166 g |
| Crodamide S wax | 50 g |
| Zinc stearate | 25 g |
| Water | 1,000 g |

After drying and possibly calandering, this theroreactive film is tested on a "Thermotest" apparatus of the SETARAM company (LYON). Red lines of density 1.4 are obtained (GAM RD 144 densitometer WRATTEN green no. 581 filter). The reaction threshold of this paper is well marked and situated at about 85° C.

EXAMPLE 5

The following composition is dispersed homogeneously, after having ground separately the color-former and the saccharin the other constituents being distributed evenly between the two grindings:

| | |
|---|---|
| SAVB pliolite (vinyl toluene acrylate copolymer sold by GOOD YEAR) 50% in WHITE SPIRIT | 30 g |
| HOECHST C wax | 8.1 g |
| Saccharin | 31.7 g |
| Martifin Al $(OH)_3$ | 40 g |
| Lactone crystal violet blue color former | 5.2 g |
| DHN 50 spirit (ESSO CHIMIE) | 430 g |
| Montanox 80 (spreading agent of SEPPIC) | 0.5 g |

This layer is deposited on paper of 50 $g/m^2$ in the proportion of 6.5 $g/m^2$. After drying and calandering, this paper is used on an ANDERSON-JACOBSON thermal printer AJ 630 (10 characters per inch and 6 lines per inch) and enables us to obtain blue recordings of density 1.0 to 0.85, according to the speed selected: 10, 15 or 30 characters per second (GAM RD 144 densitometer, WRATTEN filter no. 106). The reaction threshold is very marked and is situated at around 95° C.

EXAMPLE 6

This example is identical with example 1, except that the grinding (1) saccharin . . . 97 g is replaced by:

| | |
|---|---|
| 1'-bromo saccharin 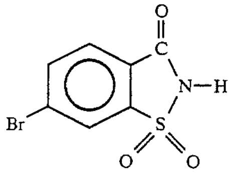 | 140 g |

The results obtained under identical conditions with such a formulation are comparable with those obtained in example 1.

EXAMPLE 7

The following composition is ground homogeneously:

| | |
|---|---|
| Latex DV 571 (ROHM Darmstadt) at 50% | 14 g |
| Methylol SACCHARIN 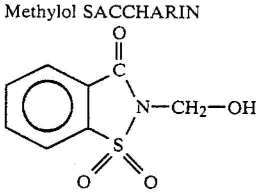 | 113 g |
| Crodamide S | 37 g |
| Zinc stearate | 16 g |
| Silica K 320 | 74 g |
| Martifin | 30 g |
| Water | 696 g |
| Polysel BASF | 4 g |

This composition is deposited in the proportion of 4 $g/m^2$ dry on a paper support of 55 $g/m^2$. Then, after drying, there is deposited on top, in the proportion of about 3 $g/m^2$ dry, the following previously ground composition:

| | |
|---|---|
| Product T 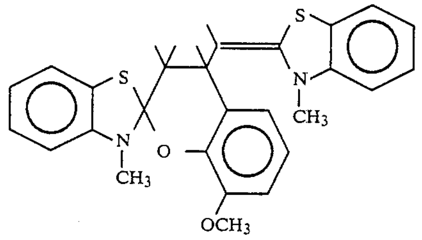 | 60 g |
| 15% Rhodoviol 4-20 in water | 105 g |
| Crodamine S | 51 g |
| Wheat starch | 50 g |
| Water | 730 g |
| Dispex | 4 g |
| Protosol DOS | 2 g |

After drying and calandering, this paper is used in an apparatus for recording electrocardiograms of the "Cardiopan 571" type of PHILIPS and enables a dark brown line very finely resolved to be obtained, whatever the speed of advance of the paper: 50, 25 or 10 mm/s. The density of the line is 0.90 (GAM RD 144 densitometer WRATTEN filter no. 106).

EXAMPLE 8

The following compositions are ground separately:

| | | |
|---|---|---|
| (1) | Saccharin | 20 g |
| | Rhodoviol 4-20 polyvinyl alcohol at 15% in water | 5 g |
| | Manganese nitrate | 12 g |
| | Water | 70 g |
| | Dispex | 0.5 g |
| (2) | Pergascript IBR black | 25 g |
| | Wheat starch | 50 g |
| | Silica K 320 | 35 g |
| | Rhodoviol 4-20, 15% in water | 115 g |
| | Crodamide S | 67 g |
| | Zinc stearate | 17 g |
| | Dispex | 4 g |
| | Protesol DOS | 2 g |
| | Water | 685 g |

Then the following mixture is prepared:

| | |
|---|---|
| Grinding (1) | 33 g |
| 5% rhodoviol 30-5 in water | 45 g |
| Grinding (2) | 30 g |

which is coated, in the proportion of 6.5 $g/m^2$ dry approximately on a 50 $g/m^2$ paper. After drying and calandering, this paper is used in an office calculating machine with a HEWLETT-PACKARD 97 thermal printer. The slightly reddish black line has a density of 1.15 (GAM RD 144 densitometer, WRATTEN no. 106 filter).

These several examples are not limiting but are purely for the purpose of illustrating the description of the invention. It is self-evident that numerous other examples could have been described by changing the derivative of saccharin, the color former, the number and arrangement of the layers, without however departing from the scope of the invention.

We must also stress that all these compositions have good stability to light and to storage under ambient conditions of temperature and humidity, as well as under more severe conditions, in high humidity, for example.

We claim:

1. A thermographic composition comprising a color former and a color developer, wherein said color developer comprises a compound of the formula:

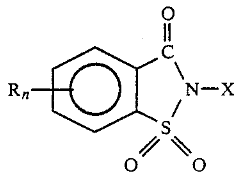

wherein n is an integer of from 0 to 4; each R independently represents H, alkyl, $NO_2$, halogen, aryl, $NH_2$, OH, COOH, $SO_3H$, $NR_1R_2$, $COOR_3$, or $OR_4$; wherein $R_1$, $R_2$, $R_3$ and $R_4$ are alkyl or aryl; X represents H, a group possessing a labile H capable of forming a stable anion by loss of a proton $H^+$, and their salts of the formula

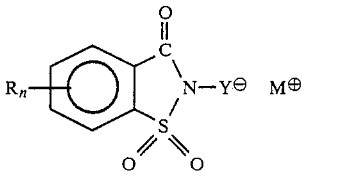

in which Y represents X minus H and $M^+$ represents a metal cation.

2. A thermographic composition according to claim 1, wherein X is selected from the group consisting of H, OH, $(CH_2)_m$—OH in which m is an integer of from 1 to 10, and

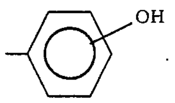

3. A thermographic composition according to claim 1 or 2, wherein X is H.

4. A thermographic composition according to claim 1 or 2, wherein R is selected from the group consisting of H, lower alkyl, halogen, nitro and amino.

5. A thermographic composition according to claim 1 or 2, wherein M is selected from the group consisting of Cu, Cd, Co, Fe (II), Ni, Mn and Zn.

6. A thermographic composition according to claim 1 or 2, wherein the color developer is selected from the group consisting of saccharin, 1'-bromo saccharin, 1'-nitro saccharin, 1'-amino saccharin, saccharin 5'-carboxylic acid, meta disaccharin, para disaccharin, and 1-methylol saccharin.

7. A thermographic composition according to claim 1, wherein the color former is selected from the group consisting of lactones of triphenyl methane colorant, fluoranes, phthalides, triaryl methane leuco-colorants, spiropyrans, chromenes, chromanes, substituted phenothiazine and colorants of phenoxazine.

8. A thermographic composition according to claims 1 or 7, further comprising at least one additional component selected from the group consisting of a polymer binder, waxes or compounds with low melting point, and a pigmentary filler.

9. A thermographic composition according to claim 1 or 7, wherein the color former/developer couples are selected from the group consisting of black color former/saccharin, Lactone crystal violet/saccharin-zinc acetate, red color former/saccharin, Lactone crystal violet/saccharin, black color former/1'-bromo saccharin, black color former/saccharin-manganese nitrate and Product T/Methylol saccharin, wherein Product T corresponds to the formula

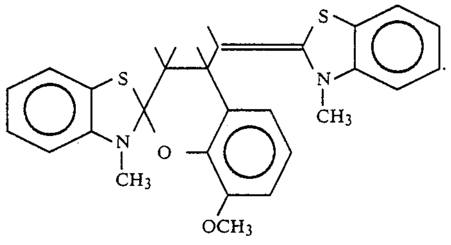

10. A method for providing a thermographic color change, said method comprising the step of heating a thermographic composition to a temperature sufficient to cause a color forming reaction between a color former and color developer therein, wherein said color developer comprises a compound to the formula:

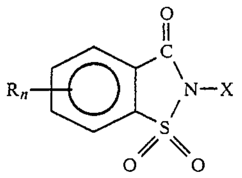

wherein n is an integer of from 0 to 4; each R independently represents H, alkyl, $NO_2$, halogen, aryl, $NH_2$, OH, COOH, $SO_3H$, $NR_1R_2$, $COOR_3$, or $OR_4$; wherein $R_1$, $R_2$, $R_3$ and $R_4$ are alkyl or aryl; x represents H, a group possessing a labile H capable of forming a stable anion by loss of proton $H^+$, and their salts of the formula

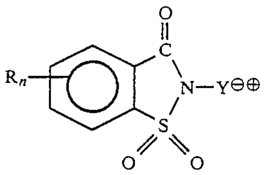

in which Y represents X minus H and $M^+$ represents a metal cation.

11. A process according to claim 10, wherein X is selected from the group consisting of H, —OH, $(CH_2)_m$—OH in which m is an integer of from 1 to 10, and

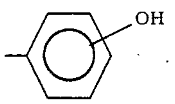

12. A process according to claim 10 or 11, wherein R is selected from the group consisting of H, lower alkyl, halogen, nitro and amino.

13. A process according to claim 10 or 11, wherein M is selected from the group consisting of Cu, Cd, Co, Fe (II), Ni, Mn and Zn.

14. A process according to claim 10 or 11, wherein the color developer is selected from the group consisting of saccharin, 1'-bromo saccharin, 1'-nitro saccharin, 1'-amino saccharin, saccharin 5'-carboxylic acid, meta disaccharin, para disaccharin, and 1-methylol saccharin.

15. A process according to claim 10, wherein the color former is selected from the group consisting of lactones of triphenyl methane colorant, fluoranes, phthalides, triaryl methane leuco-colorants, spiropyrans, chromenes, chromanes, substituted phenothiazine, and colorants of phenoxazine.

16. A process according to claim 10 or 15, wherein the thermographic composition further comprises at least one additional component selected from the group consisting of a polymer binder, waxes or compounds with low melting point, and a pigmentary filler.

17. A process according to claim 10 or 15, wherein the color former/developer couples are selected from the group consisting of black color former/saccharin, Lactone crystal violet/saccarin-zinc acetate, red color former/saccarin, Lactone crystal violet/saccharin, black color former/1'-bromo saccharin, black color former/saccharin-manganese nitrate and Product T/Methylol saccharin, wherein Product T corresponds to the formula

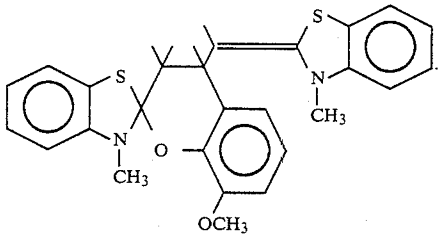

18. A process according to claim 10, wherein X is H.

* * * * *